United States Patent [19]

Dettling et al.

[11] 4,438,082

[45] Mar. 20, 1984

[54] PLATINUM GOLD CATALYST FOR REMOVING NO$_x$ AND NH$_3$ FROM GAS STREAMS

[75] Inventors: Joseph C. Dettling, Jackson; William F. Carr, Monmouth Junction; Ronald M. Heck, Frenchtown; James M. Chen, Rahway, all of N.J.

[73] Assignee: Engelhard Corporation, Iselin, N.J.

[21] Appl. No.: 430,450

[22] Filed: Sep. 30, 1982

[51] Int. Cl.$^3$ ................ C01B 21/00; C01B 21/26; B01J 8/00; B01J 8/02
[52] U.S. Cl. .................... 423/235; 423/213.5; 423/237; 423/239; 423/351; 423/403
[58] Field of Search ............... 423/235, 235 D, 239, 423/239 A, 351, 213.5, 237, 403, 648 R; 252/474

[56] References Cited

U.S. PATENT DOCUMENTS

| | | | |
|---|---|---|---|
| 2,601,221 | 6/1952 | Rosenblatt et al. | 423/648 R |
| 3,599,427 | 8/1971 | Jones | 423/213.5 |
| 3,904,740 | 9/1975 | Kenson et al. | 423/403 |
| 4,048,112 | 9/1977 | Matsushita et al. | 423/239 A |
| 4,224,292 | 9/1980 | Uchida et al. | 423/239 A |
| 4,268,488 | 5/1981 | Ginger | 423/239 A |

FOREIGN PATENT DOCUMENTS

| | | | |
|---|---|---|---|
| 50-53295 | 5/1975 | Japan | 423/237 |
| 53-108065 | 9/1978 | Japan | 423/237 |
| 54-6859 | 1/1979 | Japan | 423/239 |

*Primary Examiner*—Gregory A. Heller

[57] ABSTRACT

Selective reduction of NO$_x$ with NH$_3$ as well as decomposition of excess NH$_3$ is provided over a wide temperature range by a platinum-gold catalyst.

7 Claims, No Drawings

PLATINUM GOLD CATALYST FOR REMOVING NO$_x$ AND NH$_3$ FROM GAS STREAMS

Acid rain damages crops, forests and wildlife often many miles from the original source of pollution. Accumulating in lakes and rivers, it kills fish and aquatic plants, while interfering with the reproduction of survivors. Nitric and sulfuric acids in rain water slowly dissolve marble and granite of statues and buildings, including such treasures as the Parthenon, which has been slowly crumbling, largely from the effects of automotive and industrial pollution in Athens. Since it is thought that one of the major corrosive components of acid rain is formed when NO$_2$ combines with water droplets in rain clouds to form nitric acid, to forestall these losses governments have enacted regulations limiting the amount of nitrous oxides (either NO or NO$_2$, usually NO$_x$ for short), which may be discharged into the atmosphere by automobiles and industrial facilities. Usually, no distinction is made between NO$_2$ and NO in a discharge, since NO reacts with atmospheric oxygen to form NO$_2$.

Oxides of nitrogen are often removed from oxygen containing gas streams by adding ammonia (and oxygen, if necessary) to the stream, then passing that stream at elevated temperatures over a vanadium pentoxide catalyst to form nitrogen and water. While this method is quite effective in removing NO$_x$, it has relatively severe limitations. The most troublesome of these is that about 0.8 to 0.9 mole of ammonia should be introduced to the stream for each mole of NO$_x$ to be reduced. If there is too little ammonia, NO$_x$ passess through unreacted. If there is too much, ammonia in the effluent may itself be a significant pollutant or may react with oxygen to form NO$_x$. Thus, the ammonia level must be carefully matched to the NO$_x$ level in the stream. Typically, this would require costly and potentially troublesome measuring and control equipment. Further, vanadium pentoxide provides ideal catalytic action only between about 300° and 550° C. At lower temperatures, NH$_3$ and NO$_x$ may pass through unreacted, potentially yielding explosive ammonium nitrate. At higher temperatures, ammonia may be oxidized, forming NO$_x$. The object of this invention is to provide catalysts and catalyst systems which are useful in alleviating the problems encountered in reducing NO$_x$ using vanadium pentoxide catalyst. It has been discovered that platinum gold catalysts are useful in reducing NO$_x$ with ammonia and oxygen over the range of from about 225° to 400° C. Thus, this catalyst may either be used to reduce NO$_x$ in streams within that temperature range, or if the gold platinum catalyst is used following the previously known vanadium pentoxide catalysts, then effective reduction of NO$_x$ may be carried out by the system over the range of about 225° to 550° C. However, an even more important advantage of using platinum gold catalysts is that, in contrast to vanadia, platinum gold also preferentially catalyzes the decomposition of ammonia into hydrogen and nitrogen. Thus, the problem of matching the ammonia level to the NO$_x$ level of the stream is obviated if platinum gold is used either following or instead of the vanadium pentoxide catalyst. In the preferred embodiment of the present invention, effective reduction of NO$_x$ over a wide temperature range is provided by platinum gold catalyst placed downstream of a vanadium pentoxide catalyst. Thus, normally the vanadium pentoxide reduces much of the NO$_x$, while the platinum gold decomposes the unreacted ammonia. If, for some reason, the temperature of the stream decreases, then the platinum gold catalyst will serve to both reduce NO$_x$ and decompose ammonia. Thus, this arrangement provides extremely desirable results: the effective temperature range is increased, the problem of exactly matching the ammonia concentration to the NO$_x$ concentration is obviated, and the danger of producing ammonium nitrate is reduced.

PLATINUM GOLD CATALYST

The platinum gold catalysts used in this invention can be prepared by distributing platinum and gold on a carrier, then fixing the platinum and gold to the carrier. The platinum and gold may be distributed either as elements or as precursor compounds. The platinum in the platinum-gold catalyst composition may be present in elemental or combined forms, such as platinum or platinum oxide. One can utilize the method described in U.S. Pat. No. 4,021,374, wherein the carrier is contacted with a solution containing at least one soluble salt of platinum and at least one soluble salt of gold (such as, e.g., the ions, complexes or hydroxides of platinum and/or gold), and the impregnated support is reduced with hydrogen at a temperature of 0°–100° C. and a pressure of 1 to 10 atmospheres. If the principal use of the catalyst is to be decomposition of ammonia, palladium and platinum-palladium admixtures can be substituted for platinum in like amounts.

Another effective method of distributing and fixing the catalytic metals on the carrier is disclosed in U.S. Pat. No. 3,565,830. In the preferred methods, the carrier is immersed into a solution containing a water-soluble salt of platinum and a water-soluble salt of gold, which is agitated to insure uniform distribution of the metal. Thereafter, in order to fix the catalyst onto the support, the catalyst can be calcined within the range of from about 150° C. to 700° C. The calcination can be conducted in air such as, e.g., flowing dried air, or it may be carried out in contact with other gases such as, e.g., oxygen, nitrogen, hydrogen, flue gas, or under vacuum conditions.

In one of the preferred embodiments, the platinum and gold are coimpregnated onto the carrier. A platinum-gold bearing solution comprised of one or more water-soluble platinum salts and one or more water soluble gold salts is prepared, applied to the carrier, and the support dried to reduce its moisture content and decompose the platinum and gold salts to the active species, usually metallic gold and platinum or gold and platinum oxide.

Any of the water-soluble platinum salts known to those skilled in the art, which decompose upon heating to either platinum or an active platinum species, can be used to prepare the solution comprised of the platinum salt(s) and the gold salt(s). Thus, by way of illustration, one can use chloroplatinic acid, potassium platinum chloride, ammonium platinum thiocyanate, platinum tetramine hydroxide, platinum chloride, platinum tetramine chloride, tetraminoplatinum, tetrachlorodiamine platinum, platinum bromide, platinum fluoride and amine solutions of H$_2$Pt(OH)$_6$, ammonium platinum sulfite, and the like. Similarly, one may use water-soluble gold salts, which decompose upon heating to either gold or an active gold species such as, for example, gold bromide, gold chloride, cyanoauric acid, nitratoauric acid, and the like. If desired, solvents other than water may be used, provided that the precious metal compounds may be dissolved or suspended and the solvent removed without excessive difficulty.

Sufficient amounts of platinum and gold salts are used in the impregnating solution, so that the final catalyst composition contains from about 5 to about 95 weight percent of platinum (by weight of platinum and gold) and from about 5 to about 95 weight percent (by weight of platinum and gold) of gold. Thus, the ratio of platinum to gold can vary from about 1:20 to about 20:1, while maintaining the ability to catalyze ammonia decomposition. It is preferred that the catalyst composition contain from about 20 to about 90 weight percent of platinum and from about 80 to about 10 weight percent of gold. It is more preferred that the catalyst composition contain from about 40 to about 80 weight percent of platinum and from about 60 to about 20 weight percent of gold. It is most preferred that the composition contain from about 60 to about 80 weight percent of platinum, by weight of platinum and gold, and from about 40 to about 20 weight percent of gold. As used in this specification, the terms "platinum" and "gold" include both the elemental and active combined forms of platinum and gold but, in combined forms, all weight ratios are based upon the weight of an equivalent number of moles of metal.

The platinum-gold bearing solution can be applied to the carrier by any of the means known to those skilled in the art. Thus, for example, the carrier can be immersed in the solution, the solution can be sprayed onto the carrier, or the platinum or gold can be deposited individually in a sequential process. The carrier can be immersed in platinum, gold or a combination platinum-gold bearing solution, such that the carrier is surrounded by large excess of solution or it may be impregnated such that the total volume of the impregnation solution represents some fraction of the pore volume of the support being impregnated.

It is preferred that the carrier be coimpregnated with a single platinum-gold solution. However, the carrier may be impregnated with separate platinum and gold solutions. The coimpregnation technique is preferred, for it ensures that the platinum and gold active species are thoroughly intermingled.

After the carrier is impregnated with the platinum and gold, it may be dried at a temperature of from about 80° C. to about 130° C. (preferably 110° C.), until it contains less than about 5 (preferably 1.5) weight percent (by weight of impregnated carrier) of moisture. After drying, the soluble salts may be decomposed by heating the dry impregnated carrier to a temperature of from about 200° C. to about 600° C. (preferably 400° C. to 500° C.) in either a reducing or oxidizing atmosphere for 0.5 to 2 hours. During the second heating, the water-soluble platinum and gold salts decompose to either platinum, an active platinum species, gold, or an active gold species. Thus, for example, when chloroplatinic acid is used as the water-soluble salt, subsequent heating of the impregnated carrier drives off hydrogen chloride to produce elemental platinum. It is the intent of this invention that the platinum and gold be in close proximity to each other. The techniques for depositing each soluble metal salt of either gold or platinum alone or together or non-soluble entities of platinum or gold must be such that when on the support they can interact to provide selectivity both for selective reduction of $NO_x$ and for decomposition of ammonia over a wide temperature range.

THE VANADIUM OXIDE CATALYST

Vanadium oxide catalyst compositions used in this invention can be prepared by means well known to those skilled in the art. Thus, the catalyst can be applied to the alumina carrier by the well-known immersion method; any suitable vanadium oxide, such as $VO_2$, $V_2O_3$ and $V_2O_5$ can be used in this method. Where vanadium trioxide is used, one can heat ammonium metavanadate supported on a carrier in a stream of hydrogen at a temperature of from 250° C. to 650° C. to produce the desired vanadium trioxide. As disclosed in U.S. Pat. No. 4,003,854, the disclosure of which is hereby incorporated into this specification by reference, ammonium metavanadate or vanadium pentoxide can be dissolved in an aqueous solution of oxalic acid having a concentration of 10–360 grams/liter, the solution can be used to impregnate the alumina carrier, the carrier can then be dried at 110°–220° C., and the dried carrier can be calcined at a temperature of 400°–600° C. Thus, as is disclosed in U.S. Pat. No. 4,048,112, the disclosure of which is hereby incorporated herein by reference, one can use a vanadium salt, such as vanadyl sulfate or vanadyl chloride, dissolved in oxalic acid to prepare the impregnating solution.

The preferred vanadium oxide is vanadium pentoxide. The vanadium oxide/carrier composition can contain from about 0.5 to about 20 weight percent (by weight of vanadium oxide and carrier) of vanadium oxide. It is preferred that the vanadium oxide/carrier composition contain from about 2 to about 10 weight percent of vanadium oxide, based on the weight of the carrier, and it is most preferred that the composition contain from about 3 to about 8 weight percent of vanadium oxide.

In one preferred embodiment, the vanadium oxide/carrier composition consists essentially of vanadium oxide and carrier.

THE CATALYST CARRIER

Any of the carriers known to those skilled in the art for supporting one or more catalysts can be used in the catalyst compositions used in the process of this invention.

In one embodiment, the carrier used in the catalyst composition used in this invention is a solid unitary or monolithic skeletal body, having a plurality of unobstructed openings or channels therethrough in a direction of desired fluid flow. Advantageously, the unitary body is shaped to fit the reaction zone into which it is to be disposed. In one of the preferred aspects of this embodiment, the carrier is constructed of a substantially chemically inert, substantially catalytically-inactive, rigid, solid material capable of maintaining its shape and strength at high temperatures, for instance, up to 1100° C. or more. Advantageously, the carrier may be either a refractory oxide or a metal. The preferred refractory oxides have a bulk density of about 0.45 to 1.05 grams per cubic centimeter, preferably about 0.5 to 0.9 grams per cubic centimeter, are unglazed, and can contain a major proportion of crystalline material. Preferably, it is essentially crystalline in form and advantageously contains at least about 90% crystalline material, and is marked by the absence of any significant amount of glassy or amorphous matrices of the type found in porcelain materials. Further, the carrier should have considerable accessible porosity as distinguished from the substantially non-porous porcelain utilized for electrical appliances, for instance, spark plug manufacture, which have relatively little accessible porosity, typically about 0.011 cc./gram. The accessible pore volume of the support of this invention, not including the volume of the fluid flow channel, preferably is at least 0.03 cubic centimeters per gram of support, preferably in the range of from 0.1 to 0.3 cc./g.

When the carrier is a unitary skeletal support, it can contain macropores in communication with the channels to provide increased accessible catalyst surface and, preferably, an absence of small pores for high temperature stability and strength. While the superficial surface area of such structures may be on the order of 0.001 to 0.01 m.$^2$/g. including the channels, the total surface area is typically many times greater, so that much of the catalytic reaction will take place in the large pores. The skeletal structure can have a macropore distribution such that at least 95% of the pore volume is in pores of a size, i.e., (a diameter) of over 2,000 A. and at least 5% of the pore volume is in pores having a size of over 20,000 A. Generally, the total surface area (that is, including the pores of the support or carrier of the present invention as distinguished from the apparent or superficial surface area), is at least about 0.08 square meter per gram, preferably about 0.2 to 2 square meters per gram. The geometric superficial or apparent surface area of the carrier, including the walls of the openings, should be as large as is consistent with an acceptable back pressure in the fluid flow system.

When the carrier is a unitary skeletal support, the openings through the body can be of any shape and size consistent with the desired superficial surface and should be large enough to permit free passage of the fluids to be reacted and to prevent plugging by any particulate matter that may be present in the fluids. In one embodiment, the channels or openings are generally parallel and extend through the support from one to an opposite side, such openings being usually separated from one another by preferably thin walls defining the openings. In another embodiment, a network of channels permeates the body. The channels are unobstructed or substantially unobstructed to fluid flow. For most efficient operation, the openings are distributed across essentially the entire face or cross-section of the support.

It is preferred that the carrier used in the catalyst composition of this invention comprise a refractory inorganic oxide. Refractory inorganic oxides possess particular physical characteristics which permit adaption to the rather unique environment encountered in the operation of a motor vehicle, as well as other commercial applications. One desirable physical characteristic, for example, is that extremely high temperatures apparently do not affect the capability of the material to function as desired. Some of the preferred refractory inorganic oxides which can be used in the catalyst composition of this invention include, for example, alumina, sillimanite, magnesium silicates, zircon, petalite, spodumene, cordierite, aluminosilicates, mullite, silica, magnesium aluminum titanate, and the like.

Alumina and titania are more preferred refractory metal oxides for the carrier, although silica and zirconia can also be used advantageously. In one preferred embodiment, the carrier contains from about 50 to about 100 weight percent of alumina. Suitable forms of alumina include the chi, kappa, gamma, delta, eta and theta forms, the so-called gamma form being most preferred. Titania may be used in either the anatase or rutile form, although anatase is preferred. Since vanadia is known to promote sintering of alumina, known stabilizers may be used to counteract this tendency if alumina is to be used as the carrier for the vanadia catalyst. Stabilized aluminas which are resistant to high temperatures are disclosed in U.S. Pat. Nos. 3,945,946, 3,956,188 and 3,966,311.

In preferred embodiments, the catalyst compositions used in this invention include a catalytically-active calcined composite having a surface area of at least 20 square meters per gram (m$^2$/g) after calcination.

The calcined composite may be formed to any desired shape such as a powder, beads, spheres, extrudates, saddles, pellets. This shaping or fabricating is accomplished before calcination to promote particle adhesion. After calcination, at least one catalyst metal is added to the composite. Additionally, the composite can be applied or deposited on a relatively inert support or substrate and the catalyst metal then added, or the catalyst composition can be applied or deposited onto the inert support.

PROCESS CONDITIONS

In the process of this invention, a waste gas is contacted with at least one catalyst composition to reduce the amount of nitrogen oxides (NO$_x$) therein.

The waste gas treated in the process of this invention may be effluent from various nitration processes, an internal combustion gas or diesel engine, and the like. In general, the waste gas contains, by volume, 10 ppm or more of nitrogen oxide, 0 to 15 percent water vapor, the balance being oxygen, inert gases such as carbon dioxide, nitrogen, argon, helium, pollutants which do not poison the catalyst and the like. Preferably, the gas contains from about 2 to about 22% oxygen. In one embodiment, the waste gas is the effluent from a nitric acid process and contains, on a dry basis, from about 0.1 to about 0.5 percent by volume of mixed nitric oxide and nitrogen dioxide, about 3-4 percent by volume of oxygen, and nitrogen. In another embodiment, the waste gas contains, by volume, from about 0 to about 2000 ppm of NO, from about 0 to about 2.0 ppm of NO$_2$, (the amount of NO and NO$_2$ being present exceeding 10 ppm) from about 0 to about 10 percent of H$_2$O, from about 1 to about 22 percent of oxygen, with the remainder of the gas consisting essentially of one or more inert constituents, such as nitrogen and/or argon; the waste gas may also contain water is amounts up to about 15 percent by volume, without any detrimental effect.

To reduce the NO$_2$, from about 0.8 to about 1.4 moles of ammonia are added to the waste gas for each mole of either nitrogen oxide. It is preferred to use from about 0.9 to about 1.3 moles of ammonia per mole of nitrogen oxide. In a more preferred embodiment, from about 0.9 to about 1.2 moles of ammonia are used for each mole of nitrogen oxide in the waste gas. In still more preferred embodiments, about 0.9 to about 1.1 moles of ammonia are used for each mole of the waste gas. Of course, in the most preferred embodiment, just slightly over 1.0 mole of ammonia is used for each mole of nitrogen oxide in the waste gas, if the NO$_x$ concentration remains constant enough to permit such fine tuning.

After ammonia addition, the waste gas is contacted with a supported vanadium oxide catalyst, and then the effluent from the first reaction stage is passed over the platinum-gold catalyst composition in a second reaction stage. The reaction sequence is critical, and if the sequence is reversed (with platinum-gold in the first stage and the vanadium oxide in the second stage), at temperatures above 225° C., the platinum gold catalyst will decompose the ammonia before it can reduce the $NO_x$.

The ammonia-waste gas mixture may be passed or fed over and into contact with the supported platinum-gold catalyst at a space velocity of from about 3,000 to about 200,000 standard volumes of gas per volume of catalyst per hour. It is preferred to use a space velocity of from about 5,000 to about 40,000 standard volumes of gas per volume of catalyst per hour.

The ammonia-water gas mixture may be maintained at any convenient pressure while it is in contact with the platinum-gold catalyst composition. It is preferred to maintain the reaction temperature of this mixture at from about 250 to about 550 degrees centigrade, while it is being passed over the platinum-gold catalyst.

When a vanadium oxide catalyst is used by itself to treat waste gas, the effluent often contains ammonia. However, in the two stage process of this invention, the waste gas is first passed through a vanadium oxide catalyst and then through a platinum-gold catalyst, an extremely important unexpected benefit is obtained, as the effluent contains greatly reduced amounts of ammonia, as the excess is preferentially decomposed by the platinum-gold catalyst.

The two stages of this process of this invention can be physically arranged in any of the manners known to those skilled in the art. Thus, one can utilize two catalysts on two different supports in different portions of the same reactor; for example, the first portion of the catalyst bed of a reactor can contain the vanadium oxide catalyst and the second portion can contain the platinum-gold catalyst. Alternatively, one can utilize the vanadium oxide catalyst in one reactor and then feed the effluent from the first reactor to a second reactor, where it is contacted with the Pt/Au catalyst. Also, one end of a single support may be coated with vanadium pentoxide while the other end may be coated with the platinum gold catalyst.

The following examples are presented to illustrate the invention which is limited only by the claims. Unless otherwise specified, all parts are by weight and all temperatures are in degrees centigrade.

EXAMPLE 1

Preparation of 0.3% Reference Platinum Catalyst (11087-25-A)

202.0 grams of 5-8 mesh, gamma alumina spheres having a BET surface area of $100\pm20$ m$^2$/g, crush strength of $18\pm4$ lbs, a bulk density of approximately 43 lbs/ft$^3$, and a water uptake of 0.64 cc/g were placed into a pyrex dish having a diameter of 170 mm by a depth of 90 mm, and rotated at 35 RPM at a 45 degree angle on a device designed for that purpose. An aqueous solution of 3.02 grams of chloroplatinic acid ($H_2PtCl_6$) (0.60 g Pt) in 125 milliliters of deionized water was prepared; the pH of this solution was 1.95. The solution was added by pouring the solution rapidly on the beads, then mixed with the beads for five minutes, while continuously being rotated in the dish at 35 RPM. Thereafter, the impregnated beads were dried by a hot air stream at a temperature of 110° C. for about 40 minutes; the dried beads contained about 3% weight percent of the moisture. The dried beads were placed in a pyrex tube in an electrically-heated two zone furnace and reduced with a 7% $H_2$/93% $N_2$ gas mixture at 430° C. for two hours. The beads were then cooled to room temperature in nitrogen.

EXAMPLE 2

Preparation of 0.4% Reference Gold Catalyst (11154-2C)

Gold catalyst was prepared as in Example I, except that the gamma alumina spheres were impregnated with an aqueous solution containing 1.6018 g of gold chloride in 125 milliliters of deionized water at a pH of 1.5.

EXAMPLE 3

Preparation of 0.3% Pt/0.4% Au Catalyst (11087-25-B)

The procedure of Example 1 was substantially followed, with the exception that the impregnating solution containing 3.02 grams of chloroplatinic acid (0.6 g Pt) and 1.6 grams of gold chloride (0.8 g Au) in 125 milliliters of deionized water, and the pH of the impregnating solution was 1.95.

EXAMPLE 4

Preparation of 0.05% Pt/0.4% Au Catalyst (11154-2-B)

The procedure of Example 2 was substantially followed, with the exception that the impregnating solution contained 0.5035 grams of chloroplatinic acid (0.1 g Pt) and 1.6075 grams of gold chloride (0.9 g Au).

EXAMPLE 5

Preparation of 0.61% Pt/0.15% Au Catalyst (1154-12)

404 grams of alumina (preferably gamma alumina), which has a BET surface area of 180 m$^2$/g, and having a water uptake of approximately 0.94 cc/g, were charged into a dough mixer. 34.512 grams of gold chloride were dissolved in 200 milliliters of deionized water, and 21.7 grams of chloroplatinic acid was added to this solution; deionized water was then added to bring the total volume of 320 milliliters. The impregnating mixture was added to the gamma alumina by rapidly pouring the solution on the powder as it is being mixed, then the gamma alumina and the impregnating solution were mixed for 10 minutes. 28 grams of glacial acetic acid were added to the reaction mixture and mixed for 10 minutes. Thereafter, 30 milliliters of hydrogen peroxide were added to the reaction mixture and mixed for 10 minutes. The reaction mixture was then placed in a ½-gallon porcelain mill jar with 4 lbs. of grinding media. The composition was milled for 17 hours on a ball mill rack at about 110 RPM. The resulting slurry having a solids content of 45% was used to coat two 1½″ diameter by 3″ long Corning 300 cells/in$^2$ cordierite monoliths. The coating was applied by dipping the monoliths in the slurry for two minutes, removing, draining, then blowing off excess slurry with a hand-held air gun. The resulting units were dried four hours at 110° C. in a forced air oven and calcined in air for two hours at 425° C. The washcoat loading was 1.74 g/in$^3$ for both units.

EXAMPLE 6

Preparation of a 0.23% Pt/0.06% Au Catalyst (11154-21)

404 grams of gamma alumina were charged into the mixer used in Example 5. 6.17 g of platinum as $H_2Pt(OH)_6$ solubilized in monoethanolamine were diluted with a sufficient amount of deionized water to form a 280 milliliter solution. This platinum impregnating mixture was added to the gamma alumina powder by rapidly pouring the solution on the powder as it is being mixed, with continuous mixing for 15 minutes. 3.0894 grams of gold chloride were dissolved in 80 milliliters of deionized water and the gold impregnating solution was added to the impregnated gamma alumina powder in the same manner. 28 milliliters of acetic acid were added to the reaction mixture, which was mixed for 15 additional minutes, then placed in the ½-gallon mill jar used in Example 5 and was milled for 17 hours at about 110 RPM. The resulting slurry having a solids content of 42% was used to coat two Corning 300 cell-/in² cordierite monoliths, which were 1½" in diameter by 3" long. The units were dipped in slurry for two minutes, removed, excess slurry drained, and remaining slurry was removed with a hand-held air gun. Both units were dried in the oven and furnace described in Example 5 for 16 hours at 110° C., followed by 1 hour at 425° C. The resulting washcoat was determined to be 1.48 g/in³ average for both units.

EXAMPLE 7

Preparation of 0.039% Pt 0.014% Au Catalyst (11154-30)

In substantial accordance with the procedure of Example 5, 404.0 grams of gamma alumina were charged into the mixer. 0.777 grams of gold chloride were dissolved in 100 milliliters of deionized water, and to this solution was added a solution of 2.6167 grams of chloroplatinic acid in 60 milliliters of deionized water. Additional deionized water was added to bring the total volume of the impregnating solution up to 350 milliliters, and the impregnating solution was added to the gamma alumina powder and mixed for 15 minutes, by rapidly pouring the solution on the powder as it is being mixed. 28 milliliters of acetic acid were added to the impregnated gamma alumina, and the composition was mixed for 15 minutes, by rapidly pouring the solution on the powder as it is being mixed with a paddle mixer at about 120 RPM. The reaction mixture was placed into the ½-gallon ball mill used in Example 5, and milled for 17 hours at about 110 RPM.

The resulting slurry having a solids content of 43.5% was used to coat two Corning 300 cells/in² cordierite monoliths, which were 1½" in diameter by 3" long. Units were dipped in slurry for 2 minutes, removed, excess slurry drained, then the remaining slurry was removed with a hand-held air gun. Both units were dried in oven and furnace described in Example 5 for 16 hours at 110° C. and 1 hour at 500° C. in air. The resulting washcoat was determined to be 1.72 g/in³ average for both units.

EXAMPLE 8

Preparation of 0.005% Pt 0.0019% Au Catalyst (11154-36)

303 grams of gamma alumina were charged into the mixer used in Example 5. 0.2617 grams of chloroplatinic acid were dissolved in 50 milliliters of deionized water, and 0.0803 grams of gold chloride were dissolved in 50 milliliters of deionized water; the two solutions were combined, and a sufficient amount of deionized water was added to the solution to bring its volume up to 265 milliliters. The platinum-gold impregnating solution was added to the gamma alumina powder and mixed for 15 minutes, by rapidly pouring the solution on the powder being mixed. 21 milliliters of acetic acid were added to the impregnated carrier and mixed with it for 15 minutes by rapidly pouring the solution on the powder as it was being mixed. The composition was placed in the ½-gallon ball mill used in Example 5 and milled for 16 hours at about 110 RPM.

The resulting slurry having a solids content of 44.0% was used to coat two units of Corning 300 cells/in² cordierite monoliths, which were 1½" in diameter by 3" long. The units were dipped in slip for 2 minutes, removed, drained, then excess slurry was removed, drained, then excess slurry was removed with air from a hand-held gun. Both units were dried and calcined in the equipment described in Example 5 for 4 hours at 110° C. and 1 hour at 500° C. The resulting washcoat was determined to be 1.30 g/in³ average for both units.

EXAMPLES 9–12

In these examples, the ammonia-waste gas mixture contained 200 parts per million of NO and 5 volume % $O_2$, the $NH_3/NO_x$ mole ratio in the waste gas being 1.0. A stainless steel tubular metal reactor 9.0" long with an internal diameter of about 1.5" was filled with ⅛" diameter catalyst pellets, having the indicated compositions of Examples 1–4, set forth in Table I, and the waste gas was passed through the packed tubular metal reactor at a space velocity of 10,000 standard volumes of gas per volume of catalyst per hour, while the catalyst was maintained at the temperature indicated in Table I by a stream of hot gases from an externally-heated preheater. The effluent from the reactor was analyzed for its NO and $NO_2$ content by chemiluminescent analysis. Nitrogen oxide conversions at various reaction temperatures were determined, and the results are presented in Table I.

The combination of 0.3% platinum and 0.4% gold unexpectedly yielded nitrogen oxide conversions which were unexpectedly higher at 297° C. than those obtained with either platinum or gold. Thus, it can be seen that the platinum gold catalyst is effective over a much broader temperature range than the platinum catalyst, while the gold had essentially no catalytic activity.

EXAMPLES 13–16

In these examples, the procedure of Examples 9–12 was repeated, except that the catalyst compositions from examples 5–8 were tested in the form of thin washcoats on the walls of extruded cylindrical Corning cordierite monoliths, 1½" diameter by 3" long, having 300 square cells per square inch. The space velocity used was 10,000 standard volumes of gas per volume of catalyst per hour. The results of these experiments are presented in Table I.

These results illustrate the effect of varying the ratio of platinum to gold and demonstrate that effective reduction of $NO_x$ can be obtained over a wide range of temperatures using this platinum-gold catalyst.

EXAMPLE 17

Preparation of 6.1% Vanadium Pentoxide on Gamma Alumina (11154-23)

303 grams of gamma alumina were charged into the Blakeslee mixer used in Example 5. 53.77 grams of vanadyl sulfate ($VOSO_4 \cdot n\ H_2O$) were dissolved in 240 milliliters of deionized water. The vanadyl sulfate impregnating solution was rapidly added to the gamma alumina powder and mixed for 30 minutes in a bowl-type mixer. The impregnated carrier was dried for about 17 hours at 110° C. in a forced air oven on a pyrex tray. The dried composition was calcined in air by heating in a muffle furnace to 400° C. and holding for 1 hour, and increasing the temperature to 500° C. for 2 additional hours. 200 grams of the calcined composition were placed into the ½-gallon mill used in Example 5 with 300 ml of deionized water and 27 ml of glacial acetic acid and milled for 17 hours. The resulting slurry was adjusted with deionized $H_2O$ so as to give a slip having a solids content of 36.2%, which was used to coat 1½" diameter by 3" long cylindrical samples of Corning 300 cells/in² cordierite monoliths. The samples were dipped in slurry for 1–2 minutes, drained and the excess slurry blown from the channels with high pressure air. After impregnation, the test samples were dried for 16 hours in a forced air oven at 110° C., then calcined in air at 425° C. for 1 hour. The average washcoat loading on the samples was 1.66 g/in³ or about 175 g of $V_2O_5$/ft³.

EXAMPLE 18

Preparation of Pt/Au/$Al_2O_3$ Composition (11154-36)

303 grams of gamma-alumina were placed into the Blakeslee mixer used in Example 5. 0.2617 grams of chloroplatinic acid were dissolved in 50 milliliters of deionized water; 0.0833 grams of gold chloride were dissolved in 50 milliliters of deionized water, the gold and platinum solutions were combined, and sufficient deionized water was added to the combined solution to bring its volume up to 265 milliliters. The impregnating solution was rapidly added to the gamma-alumina powder and mixed for 15 minutes in a dough mixer. Thereafter, 21 milliliters of acetic acid were added to the reaction mixture and mixing continued for 15 minutes. The mixed composition was placed in a 1 gallon ball mill jar with an additional 50 ml of deionized water. The composition was milled for 16 hours. The resulting slurry was diluted with deionized $H_2O$ to give a slip with a solids content of 44%. It was used to coat Corning 300 cells/in² monolithic samples having a diameter of 1½" and a length of 3". The samples were dipped, drained and excess slurry blown free of the cells by high pressure air. The resulting samples were dried for 4 hours at 110° C. in a forced air oven and calcined in air for 1 hour at 500° C. The average washcoat loading was 1.56 g/in³ containing a loading of about 1.30 g precious metal/ft³ at 2.66 Pt/1Au.

EXAMPLES 19 AND 20

In these Examples, an ammonia-waste gas mixture comprised of 2000 parts per million of nitrogen oxide, 5 Volume % $O_2$ and having a $NH_3/NO_x$ mole ratio of 1.0 was prepared. A stainless steel, tubular metal reactor which was 9.0" long and has an internal diameter of about 1.5" was packed with one of the catalyst compositions by taking one of the 1½" diameter by 3" long test samples and wrapping it with a high temperature fibrous "wool" so that, when inserted into the reactor, the "wool" serves to eliminate bypass of the gases between the reactor wall and the sample. A second test core is wrapped and inserted into the reactor so as to give a catalyst bed length of 6". The distance between the first and second test core is approximately ¼". In these examples, the catalyst compositions of Examples 17 and 18 were used as indicated in the Table. The waste gas mixture was passed through the tubular metal reactor at a space velocity of 10,000 standard volumes of gas per volume of catalyst per hour, while the catalyst was being maintained at a specified temperature in the reactor by a stream of hot gases from a preheater which is heated by external electric furnace.

The effluent from the reactor was analyzed for its NO and $NO_2$ content by chemiluminescent analyzer by Beckman Industries. Nitrogen oxide conversions at various reaction temperatures were determined, and the results are presented in Table 1.

These examples demonstrate that under these conditions neither vanadium pentoxide nor platinum-gold catalysts are fully effective for reducing $NO_x$ when the mole ratio of $NH_3$ to $NO_x$ is 1 to 1.

EXAMPLE 21

(From Example 1 of CR-80-67)

In substantial accordance with the procedure of Example 17, a $V_2O_5/Al_2O_3$ catalyst composition was prepared by placing 353 g of gamma alumina powder in a mixer. 94. g of vanadyl sulfate were dissolved in 280 ml of deionized water and rapidly added to the powder, which was thereafter mixed for 15 minutes. The resulting semi-wet powder was dried for 16 hours in air at 110° C., then calcined for 1 hour at 400° C., followed by calcining at 500° C. for 1 hour. The calcined composite placed in a gallon ball mill with 52 ml of glacial acetic acid, 850 ml of deionized water and an appropriate grinding medium. The ball mill was run at 72 RPM for 17 hours so as to give a slurry suitable for coating Corning 300 cells/in² cordierite monolith with a washcoat vanadia loading of 1.7 g/in³.

In substantial accordance with the procedure of Example 9, a mixture of ammonia and waste gas comprised of 10% $H_2O$, 2000 ppm NO and 5 Volume % $O_2$ was prepared; the $NH_3/NO_x$ mole ratio in the waste gas-ammonia mixture being 1.0. A stainless steel, tubular metal reactor which was 9.0" long with an internal diameter of about 1.5" was packed as described in Examples 9–12. The gas was passed through the reactor at a pressure of 7 p.s.ig. and a space velocity of 20,000 standard volumes of gas per volume of catalyst per hour while the catalyst was maintained at the specified temperature by a stream of hot gases from an externally-heated preheater. The effluent from the reactor was analyzed for its nitrogen oxide and ammonia content. The nitrogen oxide conversions are presented in Table 1.

The effluent was analyzed to determine whether it contained ammonia. A significant amount of ammonia was found in the effluents. In the experiment conducted at 300° C., the effluent contained 0.47 moles of ammonia for each mole of ammonia in the feed. In the experiments conducted at 350°, 400° and 450° C., the effluents respectively contained 0.32, 0.18 and 0.04 moles of ammonia for each mole of ammonia in the feed.

This example demonstrates that when a vanadium pentoxide catalyst is used, it is possible to obtain high conversions of $NO_x$, but significant amounts of ammonia will be present in the effluent.

EXAMPLE 22

(From Example 2 of CR-80-67)

A Pt/Au catalyst composition was prepared as previously described in Example 6.

In substantial accordance with the procedure of Example 6, a mixture of ammonia and waste gas was prepared which was the same as that in Example 6 except that the $NH_3/NO_x$ mole ratio in the waste gas-ammonia mixture was 1.2. A stainless steel, tubular metal reactor which was 9.0" long and had an internal diameter of about 1.5" was loaded as previously described. The gas was passed through the reactor at space velocities of 10,000 20,000, 30,000 and 40,000 standard volumes of gas per volume of catalyst per hour while the catalyst was maintained at the specified temperature. The efflueach mole of ammonia in the feed. This example illustrates that when the gold-platinum catalyst is used after a vanadium pentoxide catalyst, effective reduction of $NO_x$ can be achieved over a wide range of temperatures and that excess ammonia can be safely used to achieve high $NO_x$ conversions without danger of ammonia breakthrough.

TABLE I

| Example | Catalyst | Catalyst Type (%) | % Conversion of NOx | | | | | | | | | Comments |
|---|---|---|---|---|---|---|---|---|---|---|---|---|
| | | | 236 | 250 | 267 | 297 | 327 | 350 | 388 | 400 | 450 | |
| 9* | 1 | .3Pt | | | | 90 | 67 | | | | | $NH_3/NO$ = 1:1 |
| 10* | 2 | .4Au | | | | 0 | 0 | | | | | $NH_3/NO$ = 1:1 |
| 11 | 3 | .3Pt-.4Au | | | | 95 | 87 | | | | | $NH_3/NO$ = 1:1 |
| 12 | 4 | .05Pt-.4Au | 34 | | | | 7 | | | | | $NH_3/NO$ = 1:1 |
| 13 | 5 | .61Pt-.15Au | 98 | | 89 | 79 | 64 | | | | | $NH_3/NO$ = 1:1 |
| 14 | 6 | .23Pt-.06Au | 98 | | 95 | 90 | 81 | | | | | $NH_3/NO$ = 1:1; VHSV = 10,000 |
| 15 | 7 | .039Pt-.014Au | | | 98 | 92 | 96 | 86 | 75 | | | $NH_3/NO$ = 1:1 |
| 16 | 8 | .005Pt-.0019Au | | | 57 | 86 | 65 | | | | | $NH_3/NO$ = 1:1 |
| 19* | 17 | $V_2O_5$ | 2 | | 8 | 48 | | | | | | $NH_3/NO$ = 1:1 |
| 20 | 18 | .0047Pt-.0021Au | | | 57 | 77 | 65 | | | | | $NH_3/NO$ = 1:1 |
| 21* | 17 | $V_2O_5$ | | 68 | | 98 | | 89 | | | | Excess $NH_3$ in exhaust |
| 22 | 6 | .23Pt-.06Au | | 98 | | 82 | | 62 | | 30 | | $NH_3$ in effluent ~ 0; Average of four VHSH's |
| 23 | 19 & 6 | Two Stage $V_2O_5$/ .23Pt-.06Au | | 95 | | 95 | | 95 | | 96 | 96 | $NH_3$ in effluent ~ 0 |

*Comparative Example, Prior Art Catalyst.

ent from the reactor was collected and analyzed for nitrogen oxide and ammonia content. The nitrogen oxide conversions and ammonia at various reaction temperatures are presented in Table 1.

For reach reaction temperature, the $NO_x$ Conversion was within ±5% of the value indicated in the Table which is an average of the four measured values. The amount of ammonia found in the effluent samples over the range of 225° to 450° C. was comparable to that obtained with vanadia catalyst at 450 C. and significantly less than that obtained with vanadia at lower temperatures.

This example illustrates that when the platinum gold catalyst is used the problem of ammonia breakthrough into the effluent is minimized if not entirely eliminated, and good conversions of $NO_x$ can be obtained in the lower temperature range.

EXAMPLE 23

(From Example 3 of CR-80-67)

A two-stage catalyst system having a first stage comprised of $V_2O_5/Al_2O_3$ and a second stage comprised of $Pt/Au/Al_2O_3$ was prepared by combining a 3" length of the Pt/Au catalyst of Example 22.

In substantial accordance with the procedure of Example 9, a mixture of ammonia and waste gas was prepared except that the $NO_x/NH_3$ mole ratio in the waste gas-ammonia mixture was about 1.0:1.2. A stainless steel, tubular metal reactor which was 9.0" long with an internal diameter of about 1.5" was packed as described in Example 19. The gas was passed through the $V_2O_5$ and Pt/Au catalysts at space velocities of 20,000 and 80,000 standard volumes of gas per volume of catalyst per hour, respectively. The reaction pressure was 7 p.s.i.g. The effluent from the reactor was collected and analyzed for its nitrogen oxide and ammonia content. The nitrogen oxide conversions at various reaction temperatures are presented in Table 1. No more than 0.04 moles of ammonia were found in the effluent for each mole of ammonia in the feed. This example illustrates that when the gold-platinum catalyst is used after a vanadium pentoxide catalyst, effective reduction of $NO_x$ can be achieved over a wide range of temperatures and that excess ammonia can be safely used to achieve high $NO_x$ conversions without danger of ammonia breakthrough.

As our invention, we claim:

1. A process for reducing oxides of nitrogen while maintaining an effluent free of ammonia in a gas stream containing at least about 0.8 moles of ammonia for each mole of $NO_x$ present, at least 2 mole % of oxygen, comprising the step of passing the gas stream over a catalyst containing an amount of noble metal which is effective to catalyze the reduction of nitrogen oxides to nitrogen, wherein the noble metal consists essentially of from about 0.001 to about 5.0 percent platinum and from about 0.0005 to about 2.5 percent gold by weight of support and noble metal and the temperature of the gas stream is maintained within a range in which the noble metal catalyst is effective to decompose ammonia.

2. The process of claim 1 wherein the weight ratio of platinum to gold is from about 20:1 to about 1:20.

3. The process of claim 1 wherein prior to passing the gas stream over the platinum-gold catalyst, the stream is passed over a vanadium oxide containing catalyst.

4. The process of claim 1 wherein the temperature of the stream is maintained within the range of from about 250° C. to 500° C.

5. A process for decomposing ammonia in a gas stream comprising the step of passing the gas over a catalyst containing an amount of a noble metal which is effective to catalyze the decomposition of ammonia to nitrogen and hydrogen, wherein the noble metal consists essentially of from about 0.001 to about 5.0 percent platinum and from about 0.0015 to about 2.5 percent gold by weight of support and noble metal and the temperature of the gas stream is effective to preferentially decompose ammonia.

6. The process of claim 5 wherein the gas stream also contains at least 10 ppm of oxides of nitrogen by volume.

7. The process of claim 5 wherein the gas stream contains at least 10 ppm of oxides of nitrogen and is passed over a vanadium pentoxide-containing catalyst.

* * * * *